United States Patent [19]

Schrödter

[11] Patent Number: 4,777,028

[45] Date of Patent: Oct. 11, 1988

[54] PROCESS FOR FREEING MINERAL ACIDS FROM HEAVY METALS

[75] Inventor: Klaus Schrödter, Cologne, Fed. Rep. of Germany

[73] Assignee: Hoechst Aktiengesellschaft, Hurth Knapsack, Fed. Rep. of Germany

[21] Appl. No.: 9,188

[22] Filed: Jan. 30, 1987

[30] Foreign Application Priority Data

Feb. 13, 1986 [DE] Fed. Rep. of Germany ....... 3604483

[51] Int. Cl.$^4$ .................. C01B 25/16; C01B 17/90
[52] U.S. Cl. .................. 423/321 R; 423/531
[58] Field of Search .................. 423/317, 320, 321 R, 423/561 R, 531

[56]  References Cited

U.S. PATENT DOCUMENTS

| | | | |
|---|---|---|---|
| 1,538,089 | 5/1925 | Carothers et al. | 423/321 R |
| 1,597,984 | 8/1926 | La Bour | 423/321 R |
| 3,790,661 | 2/1974 | Wasel-Nielen et al. | 423/321 R |
| 3,873,581 | 3/1975 | Fitzpatrick et al. | 423/531 X |
| 4,378,340 | 3/1983 | Berghend | 423/321 R |

FOREIGN PATENT DOCUMENTS

| | | |
|---|---|---|
| 0023195 | 2/1984 | European Pat. Off. . |
| 3418241 | 11/1985 | Fed. Rep. of Germany ...... 423/531 |
| 53-110997 | 9/1978 | Japan .............................. 423/321 R |
| 1363965 | 8/1974 | United Kingdom . |

OTHER PUBLICATIONS

Ullmans Encyklopaedie der technischen Chemie, 4th Ed., vol. 18, Verlag Chemie, Weinheim, 1979, pp. 312, 321–322.

Winnacker-Kuchler Chemische Technologie, 4th Ed., vol. 2 ("Inorganic Technology I"), ed. Hainisch, H. et al., Carl Hanser Verlag, Munich 1982, p. 219.

Primary Examiner—Gregory A. Heller

[57]  ABSTRACT

Mineral acids are freed from heavy metals, especially copper, arsenic, antimony and lead by precipitating the metals in sulfide form. To this end, the mineral acid is reacted with hydrogen sulfide or an alkali metal sulfide solution under pressure and with thorough agitation, and formed solid matter is subsequently separated from the mineral acid under the pressure selected. The mineral acid may conveniently by admixed initially with a filter aid and then treated with hydrogen sulfide or the alkali metal sulfide solution.

5 Claims, No Drawings

PROCESS FOR FREEING MINERAL ACIDS FROM HEAVY METALS

This invention relates to a process for freeing mineral acids from heavy metals, especially copper, arsenic, antimony and lead, by precipitating the heavy metals in sulfide form.

It is known that phosphoric acids can be freed from heavy metals, such as arsenic, copper and lead, by admixing the acid with a sodium sulfide solution and precipitating the heavy metals in the form of difficultly soluble compounds. The precipitated matter is more particularly separated by means of a pressure or vacuum filter (cf. "Ullmanns Enzyklopädie der technischen Chemie", 4$^{th}$ edition, 1979, volume 18, pages 312, 321 and 322; Winnacker-Küchler: "Chemische Technologie", volume 2, Anorganische Technologie I, 4$^{th}$ edition, 1982, page 219).

As disclosed in German Specification DE-PS 2 109 970, polyphosphoric acid is freed from arsenic by continuously introducing the acid overhead into a gasifying column, and by countercurrently introducing from below gaseous hydrogen sulfide and circulating it. As taught in European Specification EP-PS 23 195, arsenic and copper are separated from wet process phosphoric acid by initially metering a sodium sulfide solution into the bottom portion of an agitator-provided container filled with the acid, allowing the acid to remain in the container over some prolonged time, e.g. 2 hours, and then filtering off the acid from the precipitated sulfides.

An adverse effect which is associated with these conventional processes resides in the need to use very expensive apparatus and safety measures. The long residence times of the acid in the container which are necessary to ensure the quantitative precipitation of heavy metal sulfides invariably call for the provision of a plurality of gasifying columns or vessels with stirrer; secondly, the fact that the hydrogen sulfide is insufficiently dispersed in the mineral acid in the columns or vessels with stirrer, and which therefore partially escapes unutilized, makes it necessary for it to be used in a large excess. The unutilized hydrogen sulfide in turn must be recycled laboriously into the gasifying columns or vessels with stirrer.

It is therefore highly desirable to have a commercially attractive and efficient process for freeing mineral acids from heavy metals, which permits the metals to be precipitated in sulfide form with little engineering expense.

To this end, the invention provides for the mineral acid to be treated with hydrogen sulfide or an alkali metal sulfide solution under pressure with thorough agitation and for the solid matter forming to be separated from the mineral acid under the pressure selected.

Further preferred and optional features of the process of this invention provide:
(a) for phosphoric acid to be used as the mineral acid;
(b) for wet process phosphoric acid to be used;
(c) for sulfuric acid to be used as the mineral acid;
(d) for the mineral acid to be initially admixed with 0.05 to 5 wgt %, preferably 0.1 to 0.5 wgt %, of a filter aid and to be then treated with the hydrogen sulfide or alkali metal sulfide solution;
(e) for kieselguhr to be used as the filter aid;
(f) for the mineral acid to be admixed with hydrogen sulfide or alkali metal sulfide in a quantity of 150 to 500 mol %, preferably 200 to 300 mol %, based on the stoichiometric quantity necessary for precipitating the heavy metals in sulfide form;
(g) for the hydrogen sulfide or alkali metal sulfide solution to be reacted with the mineral acid under a pressure of 1.5 to 10 bars;
(h) for the solid matter formed to be separated from the mineral acid by means of a pressure filter;
(i) for the hydrogen sulfide or alkali metal sulfide solution to be introduced into the intake line of a high speed pump feeding the pressure filter, the precipitant being introduced thereinto immediately ahead of the pump.

An unexpected result of the process of this invention resides in the fact that the sulfides of arsenic, antimony, copper and lead are quantitatively precipitated from the mineral acid, despite the extremely short reaction period between mineral acid and hydrogen sulfide.

The high speed pump which should be used in the process of this invention preferably is a rotary pump, i.e. a conveyor pump permitting the reactants to be effectively mixed.

In the process of this invention, it is invariably necessary for a pressure of 1.5 to 10 bars, preferably 2 to 6 bars, to be maintained while conveying the mineral acid together with the precipitated heavy metal sulfides to the filter; failing this, the heavy metal sulfides are liable to undergo partial decomposition.

The present process can also be used for removing copper, arsenic, antimony and lead from hydrochloric acid.

The steps of precipitating or filtering the heavy metal sulfides should be effected at temperatures to be selected in accordance with the mineral acid concentration. It is more specifically good practice to select a temperature of 30° C. to 70° C. for treating phosphoric acid containing about 30 wgt % $P_2O_5$; of 60° C. to 90° C. for treating phosphoric acid containing about 60 wgt % $P_2O_5$; and of 100° C. to 140° C. for treating phosphoric acid containing about 85 wgt % $P_2O_5$.

The following Examples illustrate the invention which is naturally not limited thereto; the extent to which the acids become deprived of the heavy metals is indicated in the annexed Table.

EXAMPLE 1

Phosphoric acid which was obtained by processing crude phosphate with sulfuric acid by the dihydrate method and had a temperature of 50° C., was placed in a vessel with stirrer. Next, 0.1 wgt % kieselgur as a filter aid was suspended in the phosphoric acid. The whole was delivered to the intake line of a rotary pump (1500 rpm). Next, a 15 wgt % sodium sulfide solution was metered into the phosphoric acid in the intake line of the rotary pump, the sodium sulfide being used in a proportion of 300 mol %, based on the stoichiometric quantity necessary for precipitating copper sulfide and arsenic sulfide. The pressure line of the rotary pump was connected to a filter press with the aid of which the precipitated heavy metal sulfides were separated from the phosphoric acid under a pressure of 2 to 6 bars. The filtration output was 0.6 $m^3/m^2$ filter surface area per hour.

EXAMPLE 2

Example 1 was repeated with that modification however that the phosphoric acid was initially concentrated by evaporating and had a temperature of 70° C.

EXAMPLE 3

Example 1 was repeated with that modification however that phosphoric acid which had a temperature of 75° C. and was obtained by subjecting yellow phosphorus to combustion, was used.

EXAMPLE 4

Example 1 was repeated with that modification however that polyphosphoric acid which had a temperature of 110° C. and was obtained by subjecting yellow phosphorus to combustion, was used. The precipitated heavy metal sulfides were separated from the polyphosphoric acid with the use of a pressure suction filter with noble metal gauze, under a pressure of 6 bars.

EXAMPLE 5

A manganese sulfate solution which contained 5 wgt % free sulfuric acid and had a temperature of 30° C. was placed in the vessel with stirrer of Example 1. Next, 0.1 wgt % kieselguhr was suspended in the sulfuric acid manganese sulfate solution. The other procedure was as in Example 1.

As shown in the accompanying Table, it was possible to reduce the heavy metal content to less than 1 ppm in all of the above Examples.

EXAMPLE 6

Example 1 was repeated with that modification however that the sodium sulfide quantity added was 200 mol %, based on the stoichiometric quantity necessary for precipitating copper sulfide and arsenic sulfide. The filtrate was found to contain 0.3 ppm copper and 0.5 ppm arsenic.

EXAMPLE 7

Example 1 was repeated with that modification however that the quantity of sodium sulfide added was 150 mol %, based on the stoichiometric quantity necessary for precipitating copper sulfide and arsenic sulfide. The filtrate was found to contain 1.2 ppm copper and 1.9 ppm arsenic.

EXAMPLE 8

Example 1 was repeated with that modification however that 1.5 wgt % kieselguhr was suspended in the phosphoric acid. The filtration output was 0.7 $m^3/m^2$ filter surface area per hour.

EXAMPLE 9

Example 1 was repeated with that modification however that 0.08 wgt % kieselguhr was suspended in the phosphoric acid. The filtration output was 0.2 $m^3/m_2$ filter surface area per hour.

TABLE

Separation of heavy metal sulfides from mineral acids

| Ex. | Mineral acid Nature | Concentration | °C. | Arsenic (ppm) prior to separation | Arsenic (ppm) after separation | Antimony (ppm) prior to separation | Antimony (ppm) after separation | Lead (ppm) prior to separation | Lead (ppm) after separation | Copper (ppm) prior to separation | Copper (ppm) after separation |
|---|---|---|---|---|---|---|---|---|---|---|---|
| 1 | wet process phosphoric acid | 30% $P_2O_5$ | 50 | 8 | <0.05 | 1 | <0.05 | 1 | <0.01 | 19 | <0.05 |
| 2 | | 50% $P_2O_5$ | 70 | 17 | <0.1 | 1.5 | <0.05 | 1 | <0.01 | 68 | <0.05 |
| 3 | thermal phosphoric acid | 60% $P_2O_5$ | 75 | 25 | <0.1 | | | | | | |
| 4 | thermal polyphosphoric acid | 85% $P_2O_5$ | 110 | 19 | <0.5 | | | | | | |
| 5 | sulfuric acid MnSO$_4$-solution (7% strength) | 5% free $H_2SO_4$ | 30 | 1 | <0.01 | 0.1 | <0.01 | | | | |

What is claimed is:

1. A process for freeing mineral acids selected from the group consisting of phosphoric acid and sulfuric acid from heavy metals by precipitating the heavy metals as sulfides which comprises making a mixture of the mineral acid and 0.05 to 5 wgt % of a filter aid, delivering the mixture to the intake line of a high speed rotary pump, introducing a precipitant selected from hydrogen sulfide and an alkali metal sulfide solution into said intake line immediately ahead of said pump, the precipitant being used in a proportion of 150 to 500 mol %, based on the stoichiometric quantity necessary for precipitating the heavy metals in sulfide form, reacting the mixture with the precipitant under a pressure of 1.5 to 10 bars and with thorough agitation with the resultant formation of heavy metal sulfides, and subsequently separating the heavy metal sulfides and the filter aid from the mineral acid by means of a pressure filter under the pressure selected.

2. The process as claimed in claim 1, wherein the precipitant is used in a proportion of 200 to 300 mol %, based on the stoichiometric quantity necessary for precipitating the heavy metals in sulfide form.

3. The process as claimed in claim 1, wherein the mineral acid is wet process phosphoric acid.

4. The process as claimed in claim 1, wherein the filter aid is kieselguhr.

5. The process as claimed in claim 1, wherein the mineral acid is admixed with 0.1 to 0.5 wgt % of the filter aid.

* * * * *